(12) United States Patent
Funahashi

(10) Patent No.: US 7,006,679 B2
(45) Date of Patent: Feb. 28, 2006

(54) METHOD AND APPARATUS FOR FORMING ENERGY SUBTRACTION IMAGES

(75) Inventor: Takeshi Funahashi, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 576 days.

(21) Appl. No.: 10/044,903

(22) Filed: Jan. 15, 2002

(65) Prior Publication Data

US 2002/0094117 A1    Jul. 18, 2002

(30) Foreign Application Priority Data

Jan. 16, 2001   (JP)   ............................. 2001-007172

(51) Int. Cl.
*G06K 9/00*    (2006.01)

(52) U.S. Cl. .................. 382/132; 378/98.11; 378/98.8

(58) Field of Classification Search ................ 382/128, 382/129, 130, 131, 132, 133, 134, 130.131; 250/370.9, 370.11, 253, 267, 302; 378/5, 378/49, 98.8, 98.11, 98.12, 16, 82, 90, 103, 378/140, 185, 98.9
See application file for complete search history.

(56) References Cited

U.S. PATENT DOCUMENTS

| | | | |
|---|---|---|---|
| 4,710,875 A * | 12/1987 | Nakajima et al. ........... 378/162 |
| 4,761,739 A * | 8/1988 | Shimura .................... 250/583 |
| 4,855,598 A | 8/1989 | Ohgoda et al. | |
| 4,859,849 A * | 8/1989 | Shimura et al. ............ 250/582 |
| 4,896,037 A | 1/1990 | Shimura et al. | |
| 5,210,415 A * | 5/1993 | Ito ............................ 250/584 |
| 5,485,371 A | 1/1996 | Ito et al. | |
| 6,252,932 B1 * | 6/2001 | Arakawa ................... 378/98.9 |
| 6,445,767 B1 * | 9/2002 | Karellas .................... 378/98.8 |
| 6,573,507 B1 * | 6/2003 | Agano ................... 250/370.09 |

FOREIGN PATENT DOCUMENTS

JP    3-285475    12/1991

* cited by examiner

*Primary Examiner*—Kanjbhai Patel
*Assistant Examiner*—Abolfazl Tabatabai
(74) *Attorney, Agent, or Firm*—Sughrue Mion, PLLC

(57) ABSTRACT

A plurality of radiation image signals respectively representing a plurality of radiation images of an object, which radiation images have been formed with several kinds of radiation having different energy distributions, are obtained. An energy subtraction image signal is formed from the plurality of the radiation image signals. The energy subtraction image signal is formed as an energy subtraction image signal having a pixel density lower than the pixel density of each of the radiation image signals. The energy subtraction image signal is efficient for transfer to an external device, storage in an external device, and outputting of a visible image with an output device.

7 Claims, 1 Drawing Sheet

METHOD AND APPARATUS FOR FORMING ENERGY SUBTRACTION IMAGES

BACKGROUND OF THE INVENTION

1. Field of the Invention

This invention relates to a method and apparatus for forming an energy subtraction image. This invention particularly relates to a method and apparatus for forming an energy subtraction image, wherein an energy subtraction image having an altered image size is formed.

2. Description of the Related Art

Techniques for photoelectrically reading out a recorded radiation image in order to obtain an image signal, performing appropriate image processing on the image signal, and then reproducing a visible image by use of the processed image signal have heretofore been known in various fields. Also, it has been proposed to use stimulable phosphors in radiation image recording and reproducing systems. Specifically, a radiation image of an object, such as a human body, is recorded on a sheet provided with a layer of the stimulable phosphor (hereinafter referred to as a stimulable phosphor sheet). The stimulable phosphor sheet, on which the radiation image has been stored, is then exposed to stimulating rays, such as a laser beam, which cause the stimulable phosphor sheet to emit light in proportion to the amount of energy stored thereon during its exposure to the radiation. The light emitted by the stimulable phosphor sheet, upon stimulation thereof, is photoelectrically detected and converted into an electric image signal. The image signal is then processed and used for the reproduction of the radiation image of the object as a visible image on a recording material.

In the radiation image recording and reproducing systems wherein recording media, such as X-ray film or stimulable phosphor sheets, are used, subtraction processing techniques for radiation images are often performed on image signals detected from a plurality of radiation images of an object, which radiation images have been recorded on the recording media.

With the subtraction processing techniques for radiation images, an image is obtained which corresponds to a difference between a plurality of radiation images of an object recorded under different conditions. Specifically, a plurality of the radiation images recorded under different conditions are read out at predetermined sampling intervals, and a plurality of image signals thus detected are converted into digital image signals which represent the radiation images. The image signal components of the digital image signals, which components represent the image information recorded at corresponding sampling points in the radiation images, are then subtracted from each other. A difference signal is thereby obtained which represents the image of a specific structure or part of the object represented by the radiation images.

As one of the subtraction processing techniques described above, an energy subtraction processing technique has heretofore been known. In the energy subtraction processing technique, such characteristics are utilized that a specific structure of an object exhibits different levels of radiation absorptivity with respect to radiation with different energy distributions. Specifically, by the utilization of the characteristics described above, a plurality of radiation images of an object, in which different images of a specific structure of the object are embedded, are formed with several kinds of radiation having different energy distributions. Thereafter, the image signals representing the plurality of the radiation images are weighted appropriately and subjected to a subtraction process in order to extract the image of the specific structure of the object. The applicant proposed novel energy subtraction processing methods using stimulable phosphor sheets in, for example, U.S. Pat. Nos. 4,855,598 and 4,896,037, and Japanese Unexamined Patent Publication No. 3(1991)-285475.

The energy subtraction processing technique may be classified into two kinds of techniques. One of the techniques is a two-shot energy subtraction processing technique, and the other is a one-shot energy subtraction processing technique.

With the two-shot energy subtraction processing technique, radiation having a certain energy distribution is irradiated to the object, and a radiation image is formed with the radiation carrying the image information of the object. Thereafter, radiation having a different energy distribution is irradiated to the object, and a radiation image is formed with the radiation carrying the image information of the object. The two radiation images having been formed with the two kinds of radiation having different energy distributions are then subjected to the subtraction processing. The two-shot energy subtraction processing technique has the advantages in that the difference in energy level between the two shots is capable of being kept large.

With the one-shot energy subtraction processing technique, two stimulable phosphor sheets are superposed one upon the other with an energy separating plate, or the like, which changes the energy distribution of radiation, intervening therebetween, and two radiation images are formed respectively with two kinds of radiation having different energy distributions on the two stimulable phosphor sheets and with a single, simultaneous exposure to radiation. The thus formed two radiation images are then subjected to the subtraction processing. The one-shot energy subtraction processing technique has the advantages in that a shift between the object images in the two radiation images is capable of being kept small. (The one-shot energy subtraction processing technique is described in, for example, U.S. Pat. No. 4,855,598.)

As one of apparatuses for performing the energy subtraction processing, a built-in type of radiation image recording and read-out apparatus has heretofore been proposed. The built-in type of the radiation image recording and read-out apparatus comprises a radiation image recording apparatus for recording radiation images of an object, a read-out apparatus for reading out the recorded radiation images, an image processing unit for performing the subtraction processing on the radiation images having been read out, and the like, which are built within a single apparatus. With the built-in type of the radiation image recording and read-out apparatus, for example, two stimulable phosphor sheets superposed one upon the other with an energy separating filter, which absorbs low energy components of radiation, intervening therebetween are located so as to stand facing the object. In this state, the stimulable phosphor sheets are exposed to the radiation carrying the image information of the object. In this manner, a radiation image (i.e., a low energy image) is formed with radiation, which contains a comparatively large quantity of the low energy components, on a first stimulable phosphor sheet, which is close to the object. Also, a radiation image (i.e., a high energy image) is formed with radiation, which has passed through the energy separating filter and contains a comparatively large quantity of the high energy components, on a second stimulable phosphor sheet, which is remote from the object. The thus formed radiation images are read out with a predetermined read-out density, and radiation image signals having thus been obtained are subjected to the subtraction processing.

In cases where an energy subtraction image is formed with the energy subtraction processing, operation processing has heretofore been performed by directly utilizing a plurality of radiation image signals, which represent the radiation images having been formed with several kinds of radiation having different energy distributions. Therefore, a pixel density of the formed energy subtraction image becomes equal to the pixel density of the original radiation images. However, in the stage of the subtraction processing, several frequency components are lost, and noise often occurs. Accordingly, the image quality of the formed energy subtraction image becomes worse than the image quality of the original radiation images, and the energy subtraction image need not necessarily have the pixel density identical with the pixel density of the original radiation images.

The image signal representing the energy subtraction image formed with the energy subtraction processing is transferred to an external device, stored in an external device, or utilized for outputting a visible image with an output device, or the like. In such cases, there is a strong demand for reducing the image signal storage capacity and keeping the processing time, which is required for the signal transfer or the outputting of the visible image, short.

SUMMARY OF THE INVENTION

The primary object of the present invention is to provide a method of forming an energy subtraction image, wherein an energy subtraction image, which is efficient for transfer to an external device, storage in an external device, and outputting of a visible image with an output device, is capable of being formed.

Another object of the present invention is to provide an apparatus for carrying out the method of forming an energy subtraction image.

The present invention provides a method of forming an energy subtraction image, comprising the steps of:

i) obtaining a plurality of radiation image signals respectively representing a plurality of radiation images of an object, which radiation images have been formed with several kinds of radiation having different energy distributions, and ii) forming an energy subtraction image signal from the plurality of the radiation image signals, wherein the energy subtraction image signal is formed as an energy subtraction image signal having a pixel density lower than the pixel density of each of the radiation image signals.

In order for the energy subtraction image signal having the pixel density lower than the pixel density of each of the radiation image signals to be obtained, one of various techniques may be employed. For example, the subtraction processing may be performed by directly utilizing the plurality of the radiation image signals, an energy subtraction image signal having a pixel density identical with the pixel density of each of the radiation image signals may thereby be formed. Thereafter, the pixel density of the thus formed energy subtraction image signal may be lowered, and the energy subtraction image signal having the low pixel density may thereby be formed. However, the method of forming an energy subtraction image in accordance with the present invention should preferably be modified such that the pixel density of each of the radiation image signals is lowered, a plurality of low pixel density radiation image signals being thereby acquired, subtraction processing is performed by utilizing the plurality of the thus acquired low pixel density radiation image signals, and the energy subtraction image signal having the pixel density lower than the pixel density of each of the radiation image signals is thereby formed.

The pixel density of the energy subtraction image signal should preferably fall within the range of $\frac{1}{2}$ to $\frac{1}{4}$ of the pixel density of each of the radiation image signals (i.e., the total number of pixels in the energy subtraction image represented by the energy subtraction image signal should preferably fall within the range of $\frac{1}{4}$ to $\frac{1}{16}$ of the total number of pixels in each of the radiation images represented by the radiation image signals).

As a technique for obtaining the low pixel density image signal, i.e. as a technique for transforming the pixel density and obtaining the image signal having a low pixel density, one of various known pixel density transform processing techniques, such as image signal thinning-out processing, mean reduction processing, and interpolation processing, may be employed.

The present invention also provides an apparatus for forming an energy subtraction image, comprising:

i) means for obtaining a plurality of radiation image signals respectively representing a plurality of radiation images of an object, which radiation images have been formed with several kinds of radiation having different energy distributions, and ii) image processing means for forming an energy subtraction image signal from the plurality of the radiation image signals, wherein the image processing means forms the energy subtraction image signal as an energy subtraction image signal having a pixel density lower than the pixel density of each of the radiation image signals.

In the apparatus for forming an energy subtraction image in accordance with the present invention, the image processing means may have one of various constitutions, with which the energy subtraction image signal having the pixel density lower than the pixel density of each of the radiation image signals is capable of being formed. However, the apparatus for forming an energy subtraction image in accordance with the present invention should preferably be modified such that the image processing means comprises:

a pixel density transforming section for receiving the plurality of the radiation image signals, and lowering the pixel density of each of the radiation image signals in order to form a plurality of low pixel density radiation image signals, and an operation processing section for receiving the plurality of the low pixel density radiation image signals, which have been formed by the pixel density transforming section, and forming the energy subtraction image signal, which has the pixel density lower than the pixel density of each of the radiation image signals, from the low pixel density radiation image signals.

Also, the apparatus for forming an energy subtraction image in accordance with the present invention may be modified such that the apparatus further comprises means for transferring the plurality of the radiation image signals and the energy subtraction image signal toward an external device or feeding out the plurality of the radiation image signals and the energy subtraction image signal toward storage means for storing the plurality of the radiation image signals and the energy subtraction image signal.

With the method and apparatus for forming an energy subtraction image in accordance with the present invention, the energy subtraction image signal is formed as the energy subtraction image signal having the pixel density lower than the pixel density of each of the radiation image signals. Therefore, the efficiency, with which the energy subtraction image signal is transferred to the external device, the efficiency, with which the energy subtraction image signal is stored in the storage means, or the efficiency, with which a visible image is outputted by an output device in accordance with the energy subtraction image signal, is capable of being kept high.

With the method and apparatus for forming an energy subtraction image in accordance with the present invention, the pixel density of each of the radiation image signals maybe lowered, the plurality of the low pixel density radiation image signals being thereby acquired, and the subtraction processing may be performed by utilizing the plurality of the thus acquired low pixel density radiation image signals. In such cases, the time required for forming the energy subtraction image signal having the pixel density lower than the pixel density of each of the radiation image signals is capable of being kept short.

DESCRIPTION OF THE PREFERRED EMBODIMENTS

Figure 1:
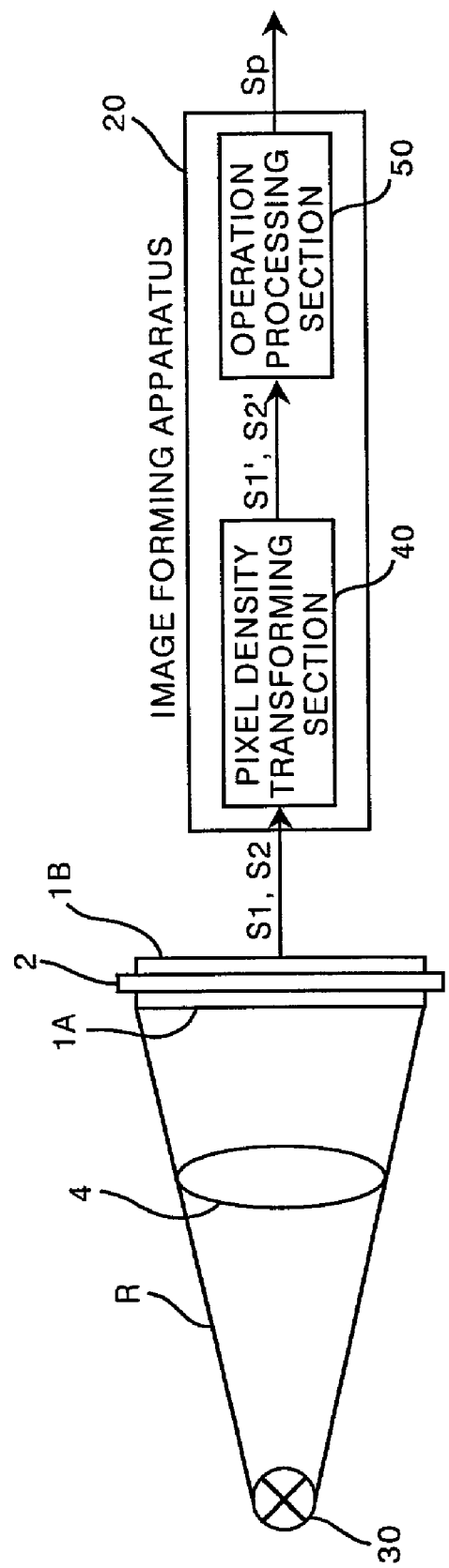
FIG. 1 is a schematic view showing an example of a radiation image recording and read-out apparatus, in which an embodiment of the apparatus for forming an energy subtraction image in accordance with the present invention is employed.

The present invention will hereinbelow be described in further detail with reference to the accompanying drawings.

FIG. 1 is a schematic view showing an example of a radiation image recording and read-out apparatus, in which an embodiment of the apparatus for forming an energy subtraction image in accordance with the present invention is employed.

With reference to FIG. 1, an image forming apparatus 20, which acts as the embodiment of the apparatus for forming an energy subtraction image in accordance with the present invention, comprises a pixel density transforming section 40 for receiving a low energy image signal S1 and a high energy image signal S2 and performing pixel density transform processing for lowering the pixel density of each of the low energy image signal S1 and the high energy image signal S2. From the pixel density transforming section 40, a low energy image signal S1' having a low pixel density and a high energy image signal S2' having the low pixel density are obtained. The image forming apparatus 20 also comprises an operation processing section 50 for receiving the low energy image signal S1' and the high energy image signal S2' from the pixel density transforming section 40 and performing the energy subtraction processing on the low energy image signal S1' and the high energy image signal S2'.

The low energy image signal S1 and the high energy image signal S2 are obtained by reading out radiation images of an object 4 from a first stimulable phosphor sheet 1A and a second stimulable phosphor sheet B, on which the radiation images of the object 4 have been formed with radiation having different energy distributions. The radiation images of the object 4 have been recorded on the first stimulable phosphor sheet 1A and the second stimulable phosphor sheet 1B with the one-shot energy subtraction processing technique. Specifically, radiation R is produced by a radiation source 30 and irradiated to the object 4. The radiation R, which carries the image information of the object 4, is irradiated to the first stimulable phosphor sheet 1A and the second stimulable phosphor sheet 1B, which are superposed one upon the other with an energy separating filter 2 intervening therebetween. In this manner, a radiation image (i.e., a low energy image) is formed with the radiation R, which contains a comparatively large quantity of low energy components, on the first stimulable phosphor sheet 1A, which is close to the object 4. Also, a radiation image (i.e., a high energy image) is formed with the radiation R, which has passed through the energy separating filter 2 and contains a comparatively large quantity of high energy components, on the second stimulable phosphor sheet 1B, which is remote from the object 4. More specifically, low energy image information of the object 4 is stored on the first stimulable phosphor sheet 1A. Also, high energy image information of the object 4 is stored on the second stimulable phosphor sheet 1B with the radiation R, which has passed through the first stimulable phosphor sheet 1A and then passed through the energy separating filter 2 for filtering out the low energy components of the radiation R. The first stimulable phosphor sheet 1A and the second stimulable phosphor sheet 1B, on which the low energy image and the high energy image of the object 4 have respectively been stored, are set one after the other in a read-out apparatus (not shown). The low energy image of the object 4 is read out from the first stimulable phosphor sheet 1A, and a low energy image signal S1 is thereby obtained. Also, the high energy image of the object 4 is read out from the second stimulable phosphor sheet 1B, and a high energy image signal S2 is thereby obtained.

The image forming apparatus 20 is connected to an external device (not shown). An energy subtraction image signal Sp is obtained from the energy subtraction processing performed by the operation processing section 50. The energy subtraction image signal Sp is transferred from the image forming apparatus 20 into the external device.

How this embodiment of the image forming apparatus 20 operates will be described hereinbelow.

The pixel density transforming section 40 receives the low energy image signal S1 and the high energy image signal S2 and performs the pixel density transform processing for lowering the pixel density of each of the low energy image signal S1 and the high energy image signal S2. From the pixel density transforming section 40, the low energy image signal S1' having the low pixel density and the high energy image signal S2' having the low pixel density are obtained. As the pixel density transform processing for lowering the pixel density of each of the low energy image signal S1 and the high energy image signal S2, one of various kinds of processing may be employed. For example, a mean value of image signal values of 2×2 pixels may be calculated and taken as the image signal value of one pixel in the image represented by the image signal having the low pixel density, and the total number of the pixels may thereby be reduced to ¼. Alternatively, the image signal may be thinned out, and the pixel density may thereby be lowered.

The operation processing section 50 receives the low energy image signal S1' having the low pixel density and the high energy image signal S2' having the low pixel density from the pixel density transforming section 40. When necessary, the operation processing section 50 performs image position matching processing, or the like, on the low energy image signal S1' having the low pixel density and the high energy image signal S2' having the low pixel density. Thereafter, the operation processing section 50 performs a subtraction process on the low energy image signal S1' having the low pixel density and the high energy image signal S2' having the low pixel density. By way of example, the subtraction process maybe performed in accordance with the formula shown below.

$$Sp = Ka \cdot S1' + Kb \cdot S2' + Kc$$

In the formula shown above, Ka represents the parameter, which defines the weighting of the low energy image signal S1' having the low pixel density, Kb represents the parameter, which defines the weighting of the high energy image signal S2' having the low pixel density, and kc represents the parameter, which defines the bias component. Ka, Kb, and Kc are fixed numbers.

The first image represented by the low energy image signal S1' having the low pixel density (i.e., the low energy image having been recorded on the first stimulable phosphor sheet 1A) is the image having been formed with the radiation R having the comparatively low energy level. Also, the second image represented by the high energy image signal S2' having the low pixel density (i.e., the high energy image having been recorded on the second stimulable phosphor sheet 1B) is the image having been formed with the radiation R having the comparatively high energy level. In cases where the object 4 is a human body, the first image and the second image have different image densities and contain the image information of a bone and a soft tissue of the human body. In cases where the subtraction process represented by the formula shown above is performed on the first image and the second image, and the energy subtraction image signal Sp is obtained from the subtraction process, the energy subtraction image represented by the energy subtraction image signal Sp is capable of being formed. Specifically, by appropriate setting of the parameters described above, a bone image, in which the pattern of the soft tissue has been erased and only the pattern of the bone is illustrated, is capable of being formed. Also, by appropriate setting of the parameters described above, a soft tissue image, in which the pattern of the bone has been erased and only the pattern of the soft tissue is illustrated, is capable of being formed. Each of the image signal representing the bone image and the image signal representing the soft tissue image is formed as the energy subtraction image signal, which has the low pixel density (i.e., the pixel density identical with the pixel density of each of the low energy image signal S1' having the low pixel density and the high energy image signal S2' having the low pixel density).

The operation processing section 50 transfers the thus formed energy subtraction image signal Sp into an external storage device or an external output device.

In the embodiment described above, the apparatus for forming an energy subtraction image in accordance with the present invention is employed in the radiation image recording and read-out apparatus for performing the one-shot energy subtraction processing technique. However, the method and apparatus for forming an energy subtraction image in accordance with the present invention are not limited to the embodiment described above.

What is claimed is:

1. A method of forming an energy subtraction image, comprising the steps of:
   i) obtaining a plurality of radiation image signals respectively representing a plurality of radiation images of an object, which radiation images have been formed with several kinds of radiation having different energy distributions, and
   ii) forming an energy subtraction image signal from the plurality of the radiation image signals, wherein the energy subtraction image signal is formed as an energy subtraction image signal having a pixel density lower than the pixel density of each of the radiation image signals.

2. A method as defined in claim 1 wherein the pixel density of each of the radiation image signals is lowered, a plurality of low pixel density radiation image signals being thereby acquired, subtraction processing is performed by utilizing the plurality of the thus acquired low pixel density radiation image signals, and the energy subtraction image signal having the pixel density lower than the pixel density of each of the radiation image signals is thereby formed.

3. A method as according to claim 1, wherein the total number of pixels in the energy subtraction image signal is within the range of ¼ to ¹⁄₁₆ of the total number of pixels in each of the radiation image signals.

4. A method as according to claim 1, wherein the pixel density is lowered using image signal thinning-out processing, mean reduction processing, or interpolation processing.

5. An apparatus for forming an energy subtraction image, comprising:
   i) means for obtaining a plurality of radiation image signals respectively representing a plurality of radiation images of an object, which radiation images have been formed with several kinds of radiation having different energy distributions, and
   ii) image processing means for forming an energy subtraction image signal from the plurality of the radiation image signals,
   wherein the image processing means forms the energy subtraction image signal as an energy subtraction image signal having a pixel density lower than the pixel density of each of the radiation image signals.

6. An apparatus as defined in claim 5 wherein the image processing means comprises:
   a pixel density transforming section for receiving the plurality of the radiation image signals, and lowering the pixel density of each of the radiation image signals in order to form a plurality of low pixel density radiation image signals, and
   an operation processing section for receiving the plurality of the low pixel density radiation image signals, which have been formed by the pixel density transforming section, and forming the energy subtraction image signal, which has the pixel density lower than the pixel density of each of the radiation image signals, from the low pixel density radiation image signals.

7. An apparatus as defined in claim 5 or 6 wherein the apparatus further comprises means for transferring the plurality of the radiation image signals and the energy subtraction image signal toward an external device or feeding out the plurality of the radiation image signals and the energy subtraction image signal.

* * * * *